United States Patent [19]

Yui et al.

[11] Patent Number: 5,605,566
[45] Date of Patent: Feb. 25, 1997

[54] INK FOR INK JET RECORDING AND INK JET RECORDING PROCESS

[75] Inventors: Toshitake Yui; Akihiko Chujo; Yasuharu Endo; Eisuke Hiraoka; Hitoshi Kojima; Atsushi Suzuki; Ken Hashimoto, all of Minami-ashigara, Japan

[73] Assignee: Fuji Xerox Co., Ltd., Tokyo, Japan

[21] Appl. No.: 622,153

[22] Filed: Mar. 27, 1996

[30] Foreign Application Priority Data

Apr. 4, 1995 [JP] Japan .................................... 7-101646

[51] Int. Cl.⁶ ........................................... C09D 11/02
[52] U.S. Cl. ........................................ 106/22 R; 106/20 D
[58] Field of Search .......................... 106/22 R, 20 D, 106/22 B

[56] References Cited

U.S. PATENT DOCUMENTS

| | | | |
|---|---|---|---|
| 544,151 | 8/1895 | Chujo et al. | 106/22 B |
| 4,620,876 | 11/1986 | Fujii et al. | 106/22 K |
| 4,661,158 | 4/1987 | Kobayashi et al. | 106/20 R |
| 4,683,002 | 7/1987 | Miura et al. | 106/20 R |
| 4,786,327 | 11/1988 | Wenzel et al. | 106/22 H |
| 4,864,324 | 9/1989 | Shirota et al. | 106/22 D |
| 5,069,718 | 12/1991 | Kappele | 106/22 B |
| 5,421,871 | 6/1996 | Onishi et al. | 106/22 K |

FOREIGN PATENT DOCUMENTS 1-149872  6/1989  Japan .

*Primary Examiner*—Helene Klemanski
*Attorney, Agent, or Firm*—Oliff & Berridge

[57] ABSTRACT

An ink for ink jet recording, which comprises water, a water-soluble dye and a water-soluble organic solvent, wherein said ink contains potassium ion in an amount of from not less than 450 ppm to not more than 10,000 ppm, and said water-soluble organic solvent comprises glycerin in an amount of from 5 to 20% by weight based on the total weight of said ink.

9 Claims, No Drawings

INK FOR INK JET RECORDING AND INK JET RECORDING PROCESS

FIELD OF THE INVENTION

The present invention relates to an ink for ink jet recording process which comprises recording on a recording material by an ink Jet recording apparatus (hereinafter referred to as "ink") and an ink jet recording process using the ink.

BACKGROUND OF THE INVENTION

The principle of ink jet recording process is that a liquid or molten solid ink is jetted through a nozzle, slit or porous film to perform recording on a paper, cloth, film, etc. As methods for jetting the ink there have been proposed various methods such as electric charge controlling method in which an ink is jetted utilizing electrostatic attraction force, drop-on-demand method (pressure pulse method) in which an ink is jetted utilizing the oscillation pressure of a piezoelectric element, and heat ink jet method which comprises utilizing a pressure developed by the thermal formation and growth of air bubbles to jet the ink. These methods can provide an image having an extremely high precision.

As an ink for use in such an ink jet recording process there has been known and used an ink comprising various water-soluble dyes or water-dispersible pigments dissolved or dispersed in water or a liquid medium comprising a water-soluble organic solvent.

Studies have been made for improving the above described conventional ink. The ink for use in ink jet printer has been studied from the following standpoint of requirements:

(1) The ink provides an image having a high solid density as well as a high line density even on a plain paper such as copying paper and bond paper and causes no feathering;

(2) The ink quickly dries up on a paper;

(3) The ink causes no clogging and always exhibits excellent jetting stability and jetting response;

(4) The ink exhibits a good storage stability over an long period of time; and (5) The ink does not undergo scorching with depositing (Kogation) on a heater used in the heat ink jet process.

In order-to satisfy these requirements, many proposals have heretofore been made.

In particular, many proposals have heretofore been made for providing an image having a high density free of feathering on a plain paper. For example, JP-A-1-149872 proposes the use of a glycol selected from the group consisting of ethylene glycol and diethylene glycol in an amount of from about 5 to 10% by weight. Although this proposal satisfies the requirement for image quality on a plain paper, it leaves something to be desired in the prevention of clogging.

The present invention has been achieved to solve the above described problems in conventional techniques and to provide an ink satisfying all the requirements.

SUMMARY OF THE INVENTION

An object of the present invention is to provide an ink for ink jet recording which provides an image having a high density and on a plain paper without image feathering, causes no clogging, always exhibits excellent jetting stability and jetting response and can be preserved over a long period of time.

As a result of extensive studies, the present inventors found that the above object of the present invention can be achieved by providing an ink for ink jet recording, which comprises water, a water-soluble dye and a water-soluble organic solvent, wherein the ink contains potassium ion in an amount of from not less than 450 ppm to not more than 10,000 ppm, and the water-soluble organic solvent comprises glycerin in an amount of from 5 to 20% by weight based on the total weight of the ink.

DETAILED DESCRIPTION OF THE INVENTION

The present invention is described in detail below.

In the present invention, one water-soluble dye may be used alone as the water-soluble dye for use in the present invention. However, two or more dyes may be preferably used in admixture for inhibiting clogging and solidification of ink. In this case, at least one of the dyes preferably contains both a sulfonic acid group and a carboxyl group. This is because it is thought that such a dye is prevented from being crystallized even after evaporation of water.

Further, in the present invention, a water-soluble dye containing potassium ion as a counter ion is preferably used. It is necessary that potassium ion be contained in the ink in an amount of from not less than 450 ppm to not more than 10,000 ppm, preferably from 500 to 5,000 ppm, particularly preferably from 500 to 2,000 ppm. If the potassium ion concentration in the ink exceeds 10,000 ppm, the resulting ink become unbalanced, thereby easily causing clogging-in the nozzle or the like. On the contrary, if the potassium ion concentration in the ink falls below 450 ppm, the resulting ink has an inadequate water resistance.

Examples of the water-soluble dye include Projet Cyan 1, Projet Magenta 1, Project Magenta 1T and Projet Yellow 1G (available from Zeneca Inc.); AE-SF VP344, Duasyn Brilliant Red F3BSF VP180 and Bayscript Yellow BG (available from Hoechst AG.); Basacid Black X34 liquid, Basacid Black X38 liquid, Basacid Red 495 liquid, Basacid Blue 752 liquid, Basacid Blue 624 liquid, Basacid Blue 765 liquid, Basacid Yellow SE0840 liquid, Basacid Yellow SE0173 liquid and Basacid Yellow 099 liquid (available from BASF AG.); Special Black SP liquid and Special Black HF (available from Bayer AG.); and C.I. Direct Black-4, C.I. Direct Black-9, C.I. Direct Black-11, C.I. Direct Black-17, C.I. Direct Black-19, C.I. Direct Black-22, C.I. Direct Black-32, C.I. Direct Black-80, C.I. Direct Black-151, C.I. Direct Black-154, C.I. Direct Black-168, C.I. Direct Black-171, C.I. Direct Black-194, C.I. Direct Black-195, C.I. Direct Blue-1, C.I. Direct Blue-2, C.I. Direct Blue-6, C.I. Direct Blue-8, C.I. Direct Blue-22, C.I. Direct Blue-34, C.I. Direct Blue-70, C.I. Direct Blue-71, C.I. Direct Blue-76, C.I. Direct Blue-78, C.I. Direct Blue-86, C.I. Direct Blue-142, C.I. Direct Blue-199, C.I. Direct Blue-200, C.I. Direct Blue-201, C.I. Direct Blue-202, C.I. Direct Blue-203, C.I. Direct Blue-207, C.I. Direct Blue-218, C.I. Direct Blue-236, C.I. Direct Blue-287, C.I. Direct Red-1, C.I. Direct Red-2, C.I. Direct Red-4, C.I. Direct Red-8, C.I. Direct Red-9, C.I. Direct Red-11, C.I. Direct Red-13, C.I. Direct Red-15, C.I. Direct Red-20, C.I. Direct Red-28, C.I. Direct Red-31, C.I. Direct Red-33, C.I. Direct Red-37, C.I. Direct Red-39, C.I. Direct Red-51, C.I. Direct Red-59, C.I. Direct Red-62, C.I. Direct Red-63, C.I. Direct Red-73, C.I. Direct Red-75, C.I. Direct Red-80, C.I. Direct Red-81, C.I. Direct Red-83, C.I.

Direct Red-87, C.I. Direct Red-90, C.I. Direct Red-94, C.I. Direct Red-95, C.I. Direct Red-99, C.I. Direct Red-101, C.I. Direct Red-110, C.I. Direct Red-189, C.I. Direct Red-227, C.I. Direct Yellow-1, C.I. Direct Yellow-2, C.I. Direct Yellow-4, C.I. Direct Yellow-8, C.I. Direct Yellow-11, C.I. Direct Yellow-12, C.I. Direct Yellow-26, C.I. Direct Yellow-27, Direct Yellow-28, C.I. Direct Yellow-33, C.I. Direct yellow-41, C.I. Direct Yellow-44, C.I. Direct Yellow-48, C.I. Direct Yellow-86, C.I. Direct Yellow-87, Direct Yellow-88, C.I. Direct Yellow-135, C.I. Direct Yellow-142, C.I. Direct Yellow-144, C.I. Food Black-1, C.I. Food Black-2, C.I. Acid Black-1, C.I. Acid Black-2, C.I. Acid Black-7, C.I. Acid Black-16, C.I. Acid Black-24, C.I. Acid Black-26, C.I. Acid Black-28, C.I. Acid Black-31, C.I. Acid Black-48, C.I. Acid Black-52, C.I. Acid Black-63, C.I. Acid Black-107, C.I. Acid Black-112, C.I. Acid Black-118, C.I. Acid Black-119, C.I. Acid Black-121, C.I. Acid Black-172, C.I. Acid Black-194, C.I. Acid Black-208, C.I. Acid Blue-1, C.I. Acid Blue-7, C.I. Acid Blue-9, C.I. Acid Blue-15, C.I. Acid Blue-22, C.I. Acid Blue-23, C.I. Acid Blue-27, C.I. Acid Blue-29, C.I. Acid Blue-40, C.I. Acid Blue-43, C.I. Acid Blue-55, C.I. Acid Blue-59, C.I. Acid Blue-62, C.I. Acid Blue-78, C.I. Acid Blue-80, C.I. Acid Blue-81, C.I. Acid Blue-90, C.I. Acid Blue-102, C.I. Acid Blue-104, C.I. Acid Blue-111, C.I. Acid Blue-185, C.I. Acid Blue-254, C.I. Acid Red-1, C.I. Acid Red-4, C.I. Acid Red-8, C.I. Acid Red-13, C.I. Acid Red-14, C.I. Acid Red-15, C.I. Acid Red-18, C.I. Acid Red-21, C.I. Acid Red-26, C.I. Acid Red-35, C.I. Acid Red-37, C.I. Acid Red-52, C.I. Acid Red-249, C.I. Acid Red-257, C.I. Acid Yellow-1, C.I. Acid Yellow-3, C.I. Acid Yellow-4, C.I. Acid Yellow-7, C.I. Acid Yellow-11, C.I. Acid Yellow-12, C.I. Acid Yellow-13, C.I. Acid Yellow-14, C.I. Acid Yellow-19, C.I. Acid Yellow-23, C.I. Acid Yellow-25, C.I. Acid Yellow-34, C.I. Acid Yellow-38, C.I. Acid Yellow-41, C.I. Acid Yellow-42, C.I. Acid Yellow-44, C.I. Acid Yellow-53, C.I. Acid Yellow-55, C.I. Acid Yellow-61, C.I. Acid Yellow-71, C.I. Acid Yellow-76, and C.I. Acid Yellow-79.

The potassium ions in the ink are mostly derived from the counter ion contained in the water-soluble dye. Thus, the content of potassium ion in the ink may be adjusted by controlling the content of potassium ion in counter ions of the water-soluble dye. The above described water-soluble dyes can be used in the present invention after processed through an ion exchange resin or the like in such a manner that the above defined potassium ion content is achieved. The water-soluble dye may contain $Na^+$, $Li^+$, $NH_4^+$, etc. as other counter ions other than $K^+$.

By controlling the content of potassium ion in this manner, a good water resistance can be obtained. Further, the occurrence of clogging can be remarkably eliminated to provide a good jetting stability. Moreover, the ink can be prevented from chemically attacking the resin constituting a head of a recording apparatus such as polyimide and epoxy, thereby providing a good preservability. The content of $K^+$, $Li^+$ and $Na^+$ can be determined by various analytical methods. For example, it can be determined with highest precision by atomic absorption spectrometry or high frequency inductively coupled plasma atomic emission spectrometry (ICP-AES). The concentration of the dye is preferably from 2.0 to 10% by weight, more preferably from 3 to 6% by weight based on the total weight of the ink. If two or more dyes are used in admixture, only the sum of the amount of these dyes is required to fall within the above defined range.

The ink of the present invention generally comprises the water-soluble organic solvent in an amount of from 8 to 40% by weight, preferably from 8.5 to 30% by weight, based on the total weight of the ink. The water-soluble organic solvent comprise glycerin, which has moisture-retaining property. The incorporation of glycerin can inhibit the occurrence of image feathering. This can also makes it difficult to cause clogging. Furthermore, the ink thus obtained is not solidified even when allowed to stand in the atmosphere. Thus, many effects are exerted. The content of glycerin is from 5 to 20% by weight, preferably from 5 to 17% by weight, more preferably from 7 to 15% by weight, based on the total weight of the ink. If the content of the glycerin falls below 5% by weight, the dye easily deposits at the tip of the head. On the contrary, if the content of the glycerin exceeds 20% by weight, the viscosity of the resulting ink becomes too high to obtain a desired jetting stability.

The ink of the present invention preferably further comprises 2,2'-thiodiethanol as a water-soluble organic solvent in an amount of from 3 to 20% by weight, particularly preferably from 4 to 10% by weight based on the total weight of the ink. If the amount of 2,2'-thiodiethanol falls below 3% by weight, it does not exhibit effects of inhibiting the generation of mildew, the modification of pH and the deposition of foreign substances. On the contrary, if the amount of 2,2'-thiodiethanol exceeds 20% by weight, the resulting image tends to be blurred.

Furthermore, the sum of the content of P, Mg and Si in the ink of the present invention is preferably not more than 10 ppm because this eliminates the deposition during a prolonged storage, and hence provides a good preservability.

Various additives may be added to the ink of the present invention to impart an improved drying property on paper. Examples of these various additives include polyhydric alcohol derivatives such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether, basic solvents such as pyrrolidone, N-methyl-2-pyrrolidone, cyclohexyl pyrrolidone and triethanolamine, and alcohols such as ethanol, isopropyl alcohol, butyl alcohol and benzyl alcohol. It is necessary that the amount of these additives in the ink is adjusted so as not to cause image feathering. Thus, the amount of these additives in the ink is generally from 0.5 to 5% by weight, preferably from 1 to 3% by weight based on the total weight of the ink.

In order to further stabilize the dissolution state of the dye, a surfactant, a dispersant, a clathrate compound, etc. may be added to the ink of the present invention. Any of nonionic, anionic and amphoteric surfactants may be used as the surfactant. In particular, a nonionic surfactant is preferred. Examples of the nonionic surfactant include polyoxyethylene nonylphenyl ethers, polyoxyethylene octylphenyl ethers, polyoxyethylene dodecylphenyl ethers, polyoxyethylene alkyl ethers, polyoxyethylene fatty acid esters, sorbitan fatty acid esters, polyoxyethylene sorbitan fatty acid esters and fatty acid alkylolamides. Examples of the anionic surfactant include alkylbenzenesulfonates, alkylphenylsulfonates, alkylnaphthalenesulfonates, formalin condensates of an alkylnaphthalenesulfonate, higher fatty acid salts, sulfuric ester salts of a higher fatty acid ester, sulfonates of a higher fatty acid ester, sulfuric ester salts of a higher alcohol ether, sulfonates of a higher alcohol ether, alkylcarboxylates of a higher alkyl sulfonamide, and sulfosuccinic acid ester salts of a higher alkylsulfonamide. Examples of the amphoteric surfactant include betaine, sulfobetaine, sulfate betaine and the like.

Besides these compounds, acrylic acid, methacrylic acid, maleic acid, water-soluble polymer comprising the salts thereof as monomer components, polyethyleneimine, polyamines, polyvinylpyrrolidone, polyethylene glycol, cellulose derivatives, cyclodextrin, macrocyclic amine, crown ethers, urea, acetamide, etc. may be used.

The content of the above described dispersion stabilizing agent is generally from 0.001 to 5% by weight, preferably from 0.005 to 2% by weight, particularly preferably from 0.01 to 1.5% by weight based on the total weight of the ink.

Furthermore, a pH buffer, a mildewproofing agent, a viscosity adjustor, an electrically-conducting agent or the like, may be added to the ink layer of the present invention, as necessary.

The ink jet recording process of the present invention can be carried out by means of an apparatus having a head member comprising silicone, glass, ceramics or plastic. The head has a passage and preferably has a heating means provided therein. The heating means has a heating element made of a polysilicone or the like and a protective layer for the heating element. The heating element can be operated at a driving frequency of from 1 to 12 kHz. With the application of such a driving frequency, the ink in the head is heated and jetted as a droplet which is then printed on the recording material.

Many proposals have been made to incorporate a moisture-retaining water-soluble organic solvent having a moisture-retaining property in the ink. In particular, it is necessary that dye molecules be left on a paper surface as much as possible to inhibit feathering and to provide an image having a high solid density and a high line density on a plain paper. For these purpose, it is most effective to use an alcohol having a valence of 3 or more, particularly glycerin. If the dye which has been adjusted the amount of counter ion contained therein as described above is used, particularly if such a dye is used with other dyes in combination, the resulting ink easily blur on a plain paper. However, by using the combination as in the present invention, the ink causes no image feathering. Further, the ink of the present invention hardly causes clogging. The ink of the present invention is not solidified even when allowed to stand in the atmosphere.

As described above, the use of the dye having an adjusted amount of potassium and glycerin in combination provides an ink having excellent properties. However, this combination also causes a remarkable pH drop and easily causes deposition of the dye. Even if a commonly used pH buffer is added to inhibit these defects, sufficient effects may not be provided. Further, the resulting ink tends to generate mildew. In general, a mildewproofing agent is used to inhibit the generation of mildew. However, this approach is disadvantageous in that it causes scorching with depositing (i.e., Kogation) on a heater. Further, if the ink contains P, Si and Mg as impurities, the foreign substances may deposit to clog the ink passage when stored over a long period of time. However, these problems can be solved by the incorporation of 2,2'-thiodiethanol in an amount of from 3 to 20% by weight as an additional water-soluble organic solvent. Further, an ink satisfying the above described requirements can be obtained.

The present invention will be described in detail with reference to the following Examples, but the invention should not be construed as being limited thereto.

EXAMPLES 1–10 AND COMPARATIVE EXAMPLES 1–6

The components set forth in Tables 1 and 2 below were thoroughly mixed with stirring. The mixture was then filtered through a filter having a pore diameter of 0.2 µm under pressure to prepare an ink. The content of the counter ion in the dye contained in these inks had been each adjusted by passing the dye through an ion exchange resin.

These inks were each subjected to the following tests. The results are shown in Table 3.

(1) Printing test

For the printing test, a prototype printer (heat ink jet process; 300 dpi) was used to print solid pattern, line, and letter images on a recording paper of FX-L paper (available from Fuji Xerox Co., Ltd.) and 4024 paper (available from Fuji Xerox Co., Ltd.). The solid density was measured by means of X-rite 404 (available from X-rite Inc.). The line density was measured by means of a microdensitometer.

The solid density of not less than 1.2 is good (represented by G) while the solid density of less than 1.2 is poor (represented by P).

The line concentration of not less than 0.8 is good (represented by G) while the line density of less than 0.8 is poor (represented by P).

For the evaluation with respect to image feathering, the letter images were subjected to relative evaluation as follows:

G . . . Good; F . . . Fair (Acceptable); P . . . Poor (2) Clogging test

After confirmed that the ink can print with the printer used in the test (1) without any problems, the operation of the printer was suspended left uncapped for 10 minutes. Thereafter, the printer was again operated to observe whether deletion of an image occurs or not at the restarting of printing. This test was conducted under conditions of 20° C., 50% RH.

Further, the printer was allowed to stand uncapped for 1 week. The nozzles were then subjected to suction by a suction apparatus mounted on the printer. The number of nozzles which had been made impossible to Jet was then determined.

G: All nozzles recovered

P: Some nozzles left unrecovered (3) Jetting stability test

Using the printer used in the test (1), printing tests were conducted in an atmosphere of 10° C.–15% RH and 30° C.–85% RH to observe the occurrence of image deletion and the change of dot diameter on the paper with time. The evaluation was conducted in accordance with the following criteria:

G: No image defects occurred during printing of 100 sheets and the dot diameter change was ±15% or less F: 10 or less image defects occurred during printing of 100 sheets and the dot diameter change was ±15% or less P: 11 or more image defects occurred during printing of 100 sheets and the dot diameter change was ±15% or more (4) pH change with time, mildew test The pH value of the ink was initially measured. The ink was allowed to stand at 20° C. and 50% RH for 1 month, and then measured for pH value to determine the pH change with time. At the same time, the ink thus aged was visually observed for the generation of mildew.

(5) Test for deposition of foreign substances

The ink was allowed to stand at a temperature of 10° C. in a closed vessel for 1 week, and then passed through a filter having a pore diameter of 10 µm to observe whether foreign substances were deposited or not.

TABLE 1

| Example Nos. | Base dye | Dye concentration (wt %) | K+ concentration (ppm) | Ion concentration in ink (mol % × 10⁻³) | | | | Glycerin concentration (wt %) | 2,2'-thiodiethanol concentration (wt %) | Ion exchanges water concentration (wt %) | Other additives |
|---|---|---|---|---|---|---|---|---|---|---|---|
| | | | | K+ | Na+ | Li+ | TEA[1] | | | | |
| Example 1 | C.I. Direct Black 168 | 3.0 | 1,369 | 3.5 | 1.1 | 1.5 | 0 | 15 | 5 | Balance | Isopropyl alcohol (3.0 wt %) |
| | C.I. Acid Yellow 23 | 1.0 | | | | | | | | | |
| Example 2 | Basacid Black X34 Liquid (BASF AG.) | 4.0 | 1,094 | 2.8 | 2.2 | 1.0 | 0.1 | 12 | 6 | Balance | |
| Example 3 | Special Black HF (Bayer AG.) | 5.0 | 1,250 | 3.2 | 2.5 | 0.5 | 0.2 | 18 | 8 | Balance | Polyoxyethylene oleyl ether (0.1 wt %): Isopropyl alcohol (3.0 wt %) |
| Example 4 | C.I. Food Black 2 | 3.0 | 1,369 | 3.5 | 0.8 | 3.0 | 0 | 8 | 7 | Balance | |
| | C.I. Direct Black 195 | 1.0 | | | | | | | | | |
| Example 5 | C.I. Food Black 2 | 5.0 | 899 | 2.3 | 1.8 | 1.5 | 0.5 | 8 | 7 | Balance | |
| Example 6 | C.I. Direct Blue 36 | 3.0 | 899 | 2.3 | 1.0 | 0.8 | 0.1 | 8 | 7 | Balance | Ethylene oxide/propylene oxide co-polymer (0.5 wt %) |
| | C.I. Direct Blue 199 | | | | | | | | | | |
| Example 7 | C.I. Direct Red 227 | 3.0 | 899 | 2.3 | 1.0 | 0.8 | 0.1 | 8 | 7 | Balance | Surfinol 465 (0.1 wt %) (Nippon surfactant) |
| | C.I. Acid Red 52 | | | | | | | | | | |
| Example 8 | Special Black HF (Bayer AG.) | 4.5 | 1,250 | 3.2 | 2.5 | 0.5 | 0.2 | 10 | 0 | Balance | Isopropyl alcohol (3.0 wt %) |
| Example 9 | C.I. Food Black 2 | 3.0 | 1,369 | 3.5 | 0.8 | 3.0 | 0 | 13 | 2 | Balance | |
| | C.I. Direct Black 195 | 1.0 | | | | | | | | | |
| Example 10 | C.I. Direct Black 195 | 3.0 | 9,100 | 2.3 | 0.2 | 0.1 | 0 | 10 | 9 | Balance | |
| | Basacid Black X34 Liquid | 2.0 | | | | | | | | | |

(Note)
[1]TEA: Triethanolamine

TABLE 2

| Example Nos. | Base dye | Dye concentration (wt %) | K+ concentration (ppm) | Ion concentration in ink (mol % × 10⁻³) | | | | Glycerin concentration (wt %) | 2,2'-thiodiethanol concentration (wt %) | Ion exchanges water concentration (wt %) | Other additives |
|---|---|---|---|---|---|---|---|---|---|---|---|
| | | | | K+ | Na+ | Li+ | TEA[1] | | | | |
| Compara. Example 1 | Special Black HF (Bayer AG.) | 5.0 | 1,408 | 3.6 | 2.8 | 0.6 | 0.2 | 0 | 10 | Balance | |
| Compara. Example 2 | C.I. Food Black 2 | 5.0 | 196 | 0.5 | 2.3 | 1.8 | 2.0 | 15 | 5 | Balance | |
| Compara. Example 3 | C.I. Food Black 2 | 3.0 | 1,369 | 3.5 | 0.8 | 3.0 | 2.0 | 4 | 10 | Balance | Isopropyl alcohol (3.0 wt %) |
| | C.I. Direct Black 195 | 1.0 | | | | | | | | | |
| Compara. Example 4 | C.I. Food Black 2 | 3.0 | 1,369 | 3.5 | 0.8 | 3.0 | 3.0 | 22 | 5 | Balance | |
| | C.I. Direct Black 195 | 1.0 | | | | | | | | | |
| Compara. Example 5 | C.I. Direct Black 195 | 3.5 | 10,010 | 2.6 | 0.1 | 0.1 | 0 | 11 | 7 | Balance | |
| | Basacid Black | 2.0 | | | | | | | | | |

TABLE 2-continued

| Example Nos. | Base dye | Dye concentration (wt %) | K$^+$ concentration (ppm) | Ion concentration in ink (mol % × 10$^{-3}$) | | | | Glycerin concentration (wt %) | 2,2'-thiodiethanol concentration (wt %) | Ion exchanges water concentration (wt %) | Other additives |
|---|---|---|---|---|---|---|---|---|---|---|---|
| | | | | K$^+$ | Na$^+$ | Li$^+$ | TEA[1] | | | | |
| Compara. Example 6 | X34 Liquid C.I. Direct Yellow 144 | 2.0 | 440 | 1.1 | 3.0 | 1.0 | 0 | 11 | 6 | Balance | |

(Note)
[1]TEA: Triethanolamine

TABLE 3

| Example Nos. | Solid density 1) | Line density 1) | Image feathering | Jetting stability test | Clogging test/ image defect | Clogging test/1 week aging | pH change with time (ΔpH) | Mildew generation | Deposition of foreign substances | Comment |
|---|---|---|---|---|---|---|---|---|---|---|
| Example 1 | G | G | G | G | None | G | 0.1 | None | None | Good image quality even on FX-L paper, good jetting stability |
| Example 2 | G | G | G | G | None | G | 0.2 | None | None | Good image quality even on FX-L paper, good jetting stability |
| Example 3 | G | G | G | G | None | G | 0.2 | None | None | Good image quality even on FX-L paper, good jetting stability |
| Example 4 | G | G | G | G | None | G | 0.1 | None | None | Good image quality even on FX-L paper, good jetting stability |
| Example 5 | G | G | G | F | None | G | 0.0 | None | None | Good image quality even on FX-L paper |
| Example 6 | G | G | G | G | None | G | 0.0 | None | None | Good image quality even on FX-L paper |
| Example 7 | G | G | G | G | None | G | 0.0 | None | None | Good image quality even on FX-L paper |
| Example 8 | G | G | G | G | None | G | 5.0 | Some | Some[2] | Reduced durability |
| Example 9 | G | G | G | G | None | G | 4.5 | Some | Some[2] | Reduced durability |
| Example 10 | G | G | G | G | None | G | 0.0 | None | None | Good image quality |
| Compara. Example 1 | P | P | P | P | None | P | 0.1 | None | None | Particularly remarkable image feathering, 40% of nozzles left unrecovered after 1 wk. ageing |
| Compara. Example 2 | G | G | G | P | Some | G | 0.1 | None | None | Poor anti clogging properties |
| Compara. Example 3 | P | P | F | F | None | P | 0.0 | None | None | 10% of nozzles left unrecovered after 1 wk. ageing |
| Compara. Example 4 | G | G | G | P | Some | G | 0.1 | None | None | Poor jetting stability, frequently occurring image defects |
| Compara. Example 5 | G | G | G | P | Some | P | 0.1 | None | None | Poor anticlogging properties |
| Comparative Example 6 | G | G | G | P | None | G | 0.0 | None | None | Poor water resistance |

[1]Data with 4024 paper (available from Xerox)
[2]The sum of the amount of P, Mg, and Si in the ink used in Examples 8 and 9 were 12 ppm and 15 ppm, respectively.

The ink for ink jet recording of the present invention having the above described constitution provides a high density image free of feathering even on a plain paper. Further, the ink of the present invention causes no clogging at the tip of nozzles due to drying of the ink. Thus, the ink of the present invention exhibits a good jetting response and jetting stability. The ink of the present invention is also excellent in preservability.

What is claimed is:
1. An ink for ink jet recording, which comprises water, a water-soluble dye and a water-soluble organic solvent, wherein said ink contains potassium ion in an amount of from not less than 450 ppm to not more than 10,000 ppm, and said water-soluble organic solvent comprises glycerin in an amount of from 5 to 20% by weight based on the total weight of said ink.

2. The ink according to claim 1, wherein said water-soluble dye has potassium ion as a counter ion.

3. The ink according to claim 1, wherein said water-soluble organic dye comprises at least two kinds of dyes.

4. The ink according to claim 1, wherein said water-soluble organic solvent further comprises 2,2'-thiodiethanol in an amount of from 3 to 20% by weight based on the total weight of said ink.

5. The ink according to claim 1, wherein said water-soluble dye has a sulfonic acid group and a carboxyl group.

6. The ink according to claim 1, wherein said ink contains at least one of phosphorus, magnesium and silicon in an amount of not more than 10 ppm in total.

7. The ink according to claim 1, wherein said ink contains said water-soluble dye in an amount of from 2.0 to 10% by weight based on the total weight of said ink.

8. An ink jet recording process which comprises jetting an ink droplet through a head to perform recording, said ink comprising water, a water-soluble dye and a water-soluble organic solvent, wherein said ink contains potassium ion in an amount of from not less than 450 ppm to not more than 10,000 ppm, and said water-soluble organic solvent comprises glycerin in an amount of from 5 to 20% by weight based on the total weight of said ink.

9. The ink jet recording process according to claim 8, wherein said jetting step is conducted with the use of a heating process.

\* \* \* \* \*